(12) United States Patent
Stafford et al.

(10) Patent No.: US 8,361,199 B2
(45) Date of Patent: Jan. 29, 2013

(54) PURIFICATION OF $H_2SE$

(75) Inventors: Nathan Stafford, Damascus, OR (US);
Richard J. Udischas, Newark, DE (US)

(73) Assignees: Air Liquide Electronics U.S. LP,
Dallas, TX (US); **American Air
Liquide, Inc.**, Fremont, CA (US)

( * ) Notice: Subject to any disclaimer, the term of this patent is extended or adjusted under 35 U.S.C. 154(b) by 46 days.

(21) Appl. No.: 13/117,257

(22) Filed: May 27, 2011

(65) Prior Publication Data

US 2012/0318140 A1    Dec. 20, 2012

(51) Int. Cl.
*B01D 53/02*    (2006.01)

(52) U.S. Cl. .................. 95/117; 95/136; 95/902; 96/132

(58) Field of Classification Search ............ 95/117, 95/136, 902; 96/132; 55/315
See application file for complete search history.

(56) References Cited

U.S. PATENT DOCUMENTS

| 4,358,627 | A | * | 11/1982 | Ameen et al. | 570/238 |
| 4,657,903 | A | * | 4/1987 | Scovill et al. | 514/185 |
| 4,790,945 | A | * | 12/1988 | Baker | 210/712 |
| 4,797,227 | A | | 1/1989 | Tom et al. | |
| 4,957,513 | A | * | 9/1990 | St. Hilaire | 95/45 |
| 5,019,364 | A | * | 5/1991 | Kitahara et al. | 423/210 |
| 5,385,689 | A | | 1/1995 | Tom et al. | |
| 5,503,657 | A | * | 4/1996 | Bouard et al. | 95/45 |
| 5,531,971 | A | | 7/1996 | Tom et al. | |
| 5,922,280 | A | * | 7/1999 | Hollinger, Jr. | 422/40 |
| 6,132,492 | A | * | 10/2000 | Hultquist et al. | 95/45 |
| 6,406,519 | B1 | * | 6/2002 | Tom et al. | 95/95 |
| 7,229,667 | B2 | * | 6/2007 | Jacksier et al. | 427/248.1 |
| 7,585,415 | B2 | * | 9/2009 | Wyse et al. | 210/639 |
| 2007/0015944 | A1 | * | 1/2007 | Hoos et al. | 570/262 |
| 2008/0296305 | A1 | * | 12/2008 | Wyse et al. | 220/565 |
| 2008/0319202 | A1 | * | 12/2008 | Gin et al. | 548/300.1 |
| 2010/0083830 | A1 | * | 4/2010 | Cross et al. | 95/134 |

FOREIGN PATENT DOCUMENTS

| JP | 03 40902 | 2/1991 |
| JP | 2007 246342 | 9/2007 |

* cited by examiner

*Primary Examiner* — Duane Smith
*Assistant Examiner* — Christopher P Jones
(74) *Attorney, Agent, or Firm* — Patricia E. McQueeney

(57) ABSTRACT

Methods of purifying $H_2Se$ by removing $H_2S$ and/or $H_2O$ are disclosed. The amount of $H_2S$ in the $H_2Se$-containing gas is reduced below 10 ppmv by passing the $H_2Se$-containing gas through an AW-500 molecular sieve. $H_2S$ and $H_2O$ are removed by passing $H_2Se$ through a 4 A molecular sieve and subsequently passing $H_2Se$ through an AW-500 molecular sieve.

13 Claims, 3 Drawing Sheets

PURIFICATION OF H₂SE

BACKGROUND

Hydrogen selenide ($H_2Se$) is a gas currently used in the photovoltaic industry for Copper Indium Gallium Selenide (CIGS) and Copper Indium Gallium Selenide Sulfide (CIGSS) thin film solar cells. Impurities in the $H_2Se$ gas may negatively affect the deposition process of the Se-containing films. Two such impurities include $H_2O$ and $H_2S$. $H_2O$ may contribute oxygen to the metals being added to the film and hinder proper deposition. $H_2S$ may be added in a controlled manner later in the process. However, sulfur is known to change the bandgap structure of the selenium-containing adsorber layer, thus impurities such as $H_2S$ in $H_2Se$ may affect the film performance. The combination of $H_2S$ and $H_2O$ is known to cause corrosion of distribution systems and their components, leading to component/system failure as well as introduction of metal impurities during the deposition process resulting from corrosion of the distribution system.

Prior art gas purifiers are known in the art. See, e.g., the Nanochem® C/CL-series gas purifiers from Matheson Tri-Gas, the Mini Gaskleen® gas purifier from Pall Microelectronics, and the MC-190 and HP-190 MicroTorr purifiers from SAES Pure Gas, Inc. However, none of these purifiers identify $H_2Se$ as the gas to be purified and $H_2O$ and $H_2S$ as the impurities to be removed.

U.S. Pat. No. 4,797,227 to Tom et al. discloses a process and composition for purifying $H_2Se$ and $H_2Te$ to remove moisture and oxidant impurities therefrom. Tom et al. note that $H_2Se$ and $H_2Te$ are extremely difficult to purify because of their high reactivity and toxicity (col. 1, lines 35-37). Tom et al. utilize aluminum-containing compounds to remove water and oxidants from $H_2Se$ or $H_2Te$ (claim 1). The water and oxidants react with the aluminum-containing compounds (col. 5, lines 25-30). Tom et al. do not address the removal of $H_2S$ from $H_2Se$.

JP2007-246342 to Taiyo Nippon Sanso Corp discloses a method for producing $H_2Se$ which has high purity and in which the water content and the amount of $H_2S$ are made particularly small. Taiyo Nippon Sanso Corp discloses the reaction of high purity $H_2$ with metallic Se and liquefies or solidifies the resulting $H_2Se$ product. This process requires a lot of energy for both the reaction and the subsequent liquefaction/solidification.

A need remains for an efficient method to remove both $H_2O$ and $H_2S$ from available $H_2Se$ supplies.

SUMMARY

Disclosed are methods of purifying a $H_2Se$-containing gas. The amount of $H_2S$ in the $H_2Se$-containing gas is reduced below 10 ppmv by passing the $H_2Se$-containing gas through an AW-500 molecular sieve. The disclosed methods may further include one or more of the following aspects:
- the purified $H_2Se$-containing gas containing less than 5 ppmv $H_2S$;
- reducing an amount of $H_2O$ in the $H_2Se$-containing gas below 20 ppmv by passing the $H_2Se$-containing gas through a 4 A molecular sieve;
- the purified $H_2Se$-containing gas containing less than 1 ppm $H_2O$;
- passing the $H_2Se$-containing gas through the 4 A molecular sieve prior to passing it through the AW-500 molecular sieve; and
- receiving the purified $H_2Se$-containing gas in a cylinder cooled to a temperature ranging from approximately −20° C. to approximately −60° C.

Also disclosed are methods of purifying $H_2Se$ by passing $H_2Se$ through a 4 A molecular sieve and subsequently passing $H_2Se$ through an AW-500 molecular sieve. The disclosed methods may further include one or more of the following aspects:
- the purified $H_2Se$ containing less than 10 ppmv $H_2S$;
- the purified $H_2Se$ containing less than 5 ppmv $H_2S$;
- the purified $H_2Se$ containing less than 20 ppmv $H_2O$;
- the purified $H_2Se$ containing less than 1 ppm $H_2O$; and
- receiving the purified $H_2Se$ in a cylinder cooled to a temperature ranging from approximately −20° C. to approximately −60° C.

BRIEF DESCRIPTION OF THE FIGURES

For a further understanding of the nature and objects of the present invention, reference should be made to the following detailed description, taken in conjunction with the accompanying figure wherein.

DETAILED DESCRIPTION OF PREFERRED EMBODIMENTS

Figure 1A:
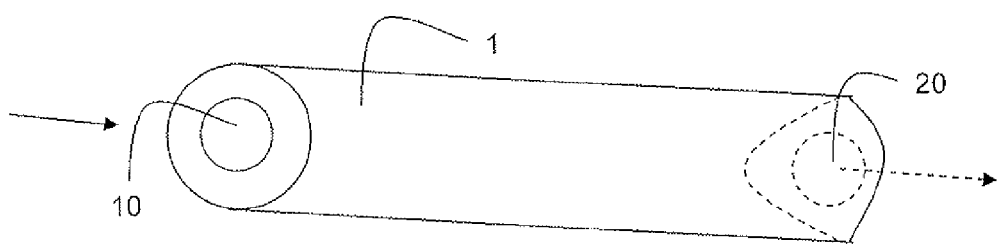
FIG. 1a is an illustration of an exemplary purification container.

Disclosed are methods of purifying $H_2Se$-containing gases, such as "pure" $H_2Se$ gas. Applicants have discovered that the quantities of impurities in $H_2Se$ may change during use or over time. For example, a $H_2Se$ cylinder initially containing 25 ppm $H_2O$ contained 600 ppm $H_2O$ when the cylinder was nearly empty. Of course, these changes will affect the quality of the resulting photovoltaic product. Therefore, $H_2Se$ used for CIGS or CIGSS deposition should have as high a purity as possible.

Due to the reactivity of $H_2Se$ and $H_2Se$-containing gases, the disclosed purification methods and any subsequent storage should be performed in systems and stored in vessels through which inert gas previously flowed to remove air and moisture. Exemplary inert gases include $N_2$, Ar, He, and combinations thereof. In the following examples, $N_2$ was used. The stainless steel components of the purification system should undergo complete electro polish and drying.

In order to prevent generation of additional impurities in the purified $H_2Se$ gas, it should be stored in cylinders having surfaces with which the $H_2Se$ does not react. Suitable surfaces include steel, carbon steel with Ni coating, aluminum, stainless steel, glass, quartz, nylon, metal alloys sold under the trademark Monel®, metal alloys sold under the trademark Hastelloy®, fluorine-containing resins sold under the trademark Teflon®, synthetic rubber sold under the trademark Kalrez®, synthetic rubber sold under the trademark Viton®, and/or glassware sold under the trademark Pyrex®. Preferably, the purified $H_2Se$ is stored in cylinders made of aluminum or carbon steel with Ni coating.

$H_2Se$-containing gas is commercially available. $H_2Se$ is most often produced in a high temperature reaction of $H_2$ with molten Se [$H_2$ (g)+Se (molten)→$H_2Se$ (g)]. The reaction produces a $H_2Se$-containing gas comprising approximately 95% v/v to approximately 99.9% v/v $H_2Se$, and typically comprising approximately 99.5% v/v to approximately 99.99% v/v $H_2Se$. $H_2S$ impurities in the $H_2Se$-containing gas are produced from sulfur impurities in the selenium used to produce the gas. While low-sulfur selenium is commercially available, it is very expensive to remove sufficient sulfur to produce low $H_2S$ in the $H_2Se$-containing gas.

Applicants have surprisingly found that $H_2S$ in the $H_2Se$-containing gas is adsorbed by AW-500 when flowing the $H_2Se$-containing gas through AW-500 molecular sieve. This result is unexpected because a different molecular sieve having the same pore size as the AW-500 molecular sieve did not remove $H_2O$ or $H_2S$ from the $H_2Se$-containing gas.

$H_2Se$ has a critical diameter of approximately 4 angstrom. The critical diameter is the approximate molecular diameter of a molecule. $H_2S$ has a critical diameter of 3.6 angstroms. $H_2O$ has a critical diameter of 3.2 angstroms. Based on these sizes, one of ordinary skill in the art would expect the best molecular sieve that would capture $H_2O$ and $H_2S$ without capturing $H_2Se$ to have a pore size of approximately 4 angstroms. However, the AW-500 molecular sieve has a pore size of 5 angstroms, but still effectively removes $H_2S$ (3.6 angstroms/134 pm) from $H_2Se$ (4 angstroms/146 pm), notwithstanding that both molecules are smaller than the pore size of the AW-500 molecular sieve. Additionally, the polarities of the three molecules are similar: $H_2Se$ (0.59 D), $H_2S$ (0.97 D), and $H_2O$ (1.85 D), making separation by adsorption techniques difficult (D=debyes; 1 coulomb-meter=$2.9979 \times 10^{29}$ D).

The $H_2Se$-containing gas contacts the AW-500 molecular sieve by flowing through a container of the AW-500 molecular sieve. The AW-500 molecular sieve is commercially available. Currently, AW-500 is supplied as 1/16" or 1/8" pellets. Either size may be used in the disclosed methods. The AW-500 molecular sieve may be placed in a container made of stainless steel. Alternatively, the AW-500 molecular sieve may be placed in a container made of aluminum, stainless steel passivated by $SiH_4$, or nickel plated carbon steel. The container should have an inlet and outlet. In one alternative, depicted in FIG. 1A, the inlet 10 and outlet 20 are located on opposite ends of the container 1 in order to minimize dead flow zones within the molecular sieve. The arrows in FIG. 1A depict the direction of gas flow through the container 1. However, alternative inlet and outlet locations may also be desired, such as the inlet 10 being located on one end of a cylindrical container 1 with the outlet 20 located on the cylindrical surface of the container 1 at the other end of the container 1. One of ordinary skill in the art will recognize that the shape of the container 1 is not limited to a cylinder, but may also include spherical, cubic, or other polyhedric shapes.

The commercially available AW-500 molecular sieve is provided in its activated state by the manufacturer. Applicants, however, re-activate the AW-500 molecular sieve prior to use in order to remove any contaminants that may have been adsorbed during transport from the manufacturer, during transport from its original container to the purification container, or from the purification container itself. Applicants activate the AW-500 molecular sieve by heating it to a temperature ranging from approximately 150° C. to approximately 250° C. under an inert gas for approximately 10 to approximately 24 hours. The inert gas may be $N_2$, Ar, He, or combinations thereof. One of ordinary skill in the art will recognize that the amount of molecular sieve to be activated will determine the activation time and temperature, with larger quantities requiring either longer times or higher temperatures and smaller quantities requiring less time or lower temperatures. The AW-500 may be activated by heating to temperatures as high as 600° C. However, heating the AW-500 to such temperatures will require the remaining components in the purification system, such as valves, to become more expensive because they will be engineered to withstand exposure to such temperatures. As a result, activation at temperatures below 300° C. permits the use of less expensive valves in the purification system.

The initial reaction between the $H_2Se$-containing gas and the AW-500 molecular sieve produces $CO_2$. Therefore, after activation of the AW-500 molecular sieve, the initial $H_2Se$-containing gas flowing through the AW-500 molecular sieve is vented. Applicants have not calculated the time required to reduce the $CO_2$ levels resulting from initial contact between the $H_2Se$-containing gas and the AW-500 molecular sieve with relation to the amount of molecular sieve. However, the initial reaction causes the temperature of the AW-500 molecular sieve to rise. In order to produce high purity $H_2Se$ gas (i.e., containing low quantities of $CO_2$), Applicants have allowed the $H_2Se$ gas to flow through the AW-500 molecular sieve until the temperature of the AW-500 molecular sieve returned to room temperature (approximately 15° C. to approximately 30° C.). For approximately 10 kg of AW-500 molecular sieve and a $H_2Se$-containing gas flow rate of approximately 100 cc/min to approximately 1,000 cc/min, the average time to reach room temperature has been approximately 2 hours. The purified $H_2Se$ gas contained less than approximately 3 ppm $CO_2$. One of ordinary skill in the art will recognize that different amounts of AW-500 may require longer or shorter venting periods. Additionally, one of ordinary skill will recognize that higher concentrations of $CO_2$ may be acceptable for some $H_2Se$ applications and, as a result, the disclosed purification process may require little or no venting time.

In order to reduce the amount of $H_2S$ in the $H_2Se$-containing gas, the $H_2Se$-containing gas flows through the AW-500 molecular sieve that has been prepared in accordance with the paragraphs above. The $H_2Se$-containing gas should remain in contact with the AW-500 molecular sieve for approximately 0.5 seconds to approximately 100 seconds, and preferably from approximately 2 seconds to approximately 40 seconds. The process may take place at room temperature (approximately 15° C. to approximately 30° C.). Alternatively, the process may take place at a temperature ranging from approximately 0° C. to approximately 35° C. However, as shown in the Examples that follow, more $H_2S$ is adsorbed on the AW-500 molecular sieve during the room temperature process than during the lower temperature processes.

The resulting $H_2Se$-containing gas has less than 10 ppmv $H_2S$, and preferably less than 5 ppmv $H_2S$, and contains between approximately 99.995% v/v and approximately 99.999% v/v $H_2Se$.

Figure 1B:
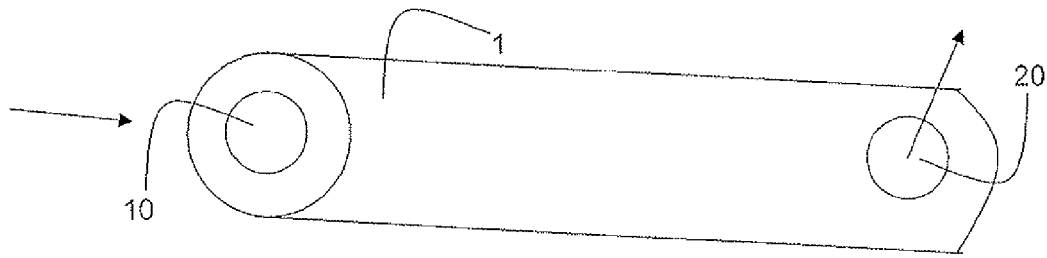
FIG. 1b is an illustration of an alternate purification container.

Water ($H_2O$) is also preferably removed from the $H_2Se$-containing gas. The presence of moisture may contribute to the corrosion of piping and gas distribution systems even at very low concentrations. $H_2O$ may be removed by flowing the $H_2Se$-containing gas through 4 A molecular sieve. The 4 A molecular sieve is commercially available. Currently, 4 A molecular sieve is supplied as 14×30 granular, 10×20 beads, 8×12 beads, 4×8 beads, 1/16" pellets, and 1/8" pellets. Any of these sizes may be used in the disclosed methods. Like the AW-500 molecular sieve, the 4 A molecular sieve may be stored in a stainless steel container. Alternatively, the 4 A molecular sieve may be placed in a container made of aluminum, stainless steel passivated with $SiH_4$, or nickel plated carbon steel. Like the container for the AW-500 molecular sieve, the container for the 4 A molecular sieve should have an inlet and outlet. In one alternative, depicted in FIG. 1A, the inlet 10 and outlet 20 are located on opposite ends of the container 1 in order to minimize dead flow zones within the molecular sieve. The arrows in FIG. 1A depict the direction of gas flow through the container 1. However, alternative inlet and outlet locations may also be desired, such as the inlet 10 being located on one end of a cylindrical container 1 with the outlet 20 located on the cylindrical surface of the container 1 at the other end of the container 1 as depicted in FIG. 1B. One of ordinary skill in the art will recognize that the shape of the container 1 is not limited to a cylinder, but may also include spherical, cubic, or other polyhedric shapes.

Prior to use, the 4 A molecular sieve is activated by heating it under an inert gas to a temperature ranging from approximately 150° C. to approximately 250° C. for approximately 10 to approximately 24 hours. The inert gas may be $N_2$, Ar, He, or combinations thereof. $N_2$ is adsorbed on the 4 A molecular sieve at these temperatures. Therefore, a He purge should follow activation of the 4 A molecular sieve under a $N_2$ atmosphere in order to produce a purified $H_2Se$ gas having low quantities of $N_2$. For each 500 g of 4 A molecular sieve, the flow of the inert gas should be proportional to approximately 100 cc/min (i.e. 500 g=100 cc/min; 1 kg=200 cc/min, etc.). After approximately 8 hours of He purge, purification of the $H_2Se$-containing gas may begin. One of ordinary skill in the art will recognize that different amounts of 4 A may require a longer or shorter activation period.

In order to reduce the amount of $H_2O$ in the $H_2Se$-containing gas, the $H_2Se$-containing gas is passed through the 4 A molecular sieve that has been prepared in accordance with the paragraph above. The $H_2Se$-containing gas should remain in contact with the 4 A molecular sieve for approximately 0.5 seconds to approximately 100 seconds, and preferably from approximately 2 seconds to approximately 40 seconds. The process may take place at room temperature (approximately 15° C. to approximately 30° C.). Alternatively, the process may take place at a temperature ranging from approximately 0° C. to approximately 35° C.

The resulting $H_2Se$-containing gas has less than 20 ppmv $H_2O$, and preferably less than 1 ppmv $H_2O$, and contains between approximately 99.995% v/v and approximately 99.999% v/v $H_2Se$.

The water removal step using the 4 A molecular sieve may occur before or after the $H_2S$ removal step using the AW-500 molecular sieve. When the water removal step follows the $H_2S$ removal step, Applicants believe that the 4 A molecular sieve helps to reduce the $CO_2$ produced from the reaction of $H_2Se$ and the AW-500 molecular sieve. When the $H_2S$ removal step follows the water removal, Applicants believe that the water content in the $H_2Se$-containing gas will be reduced so that little to no $CO_2$ will be produced by the reaction of $H_2Se$ and the AW-500 molecular sieve. In another alternative, both the AW-500 molecular sieve and the 4 A molecular sieve may be stored in the same container to simultaneously remove $H_2S$, $H_2O$, and $CO_2$.

After purification, the purified gas may be transferred to suitable cylinders at a temperature ranging from approximately −20° C. to approximately −60° C. The cylinder may be located on a scale to assure that the cylinder is not overfilled with $H_2Se$.

Figure 2:
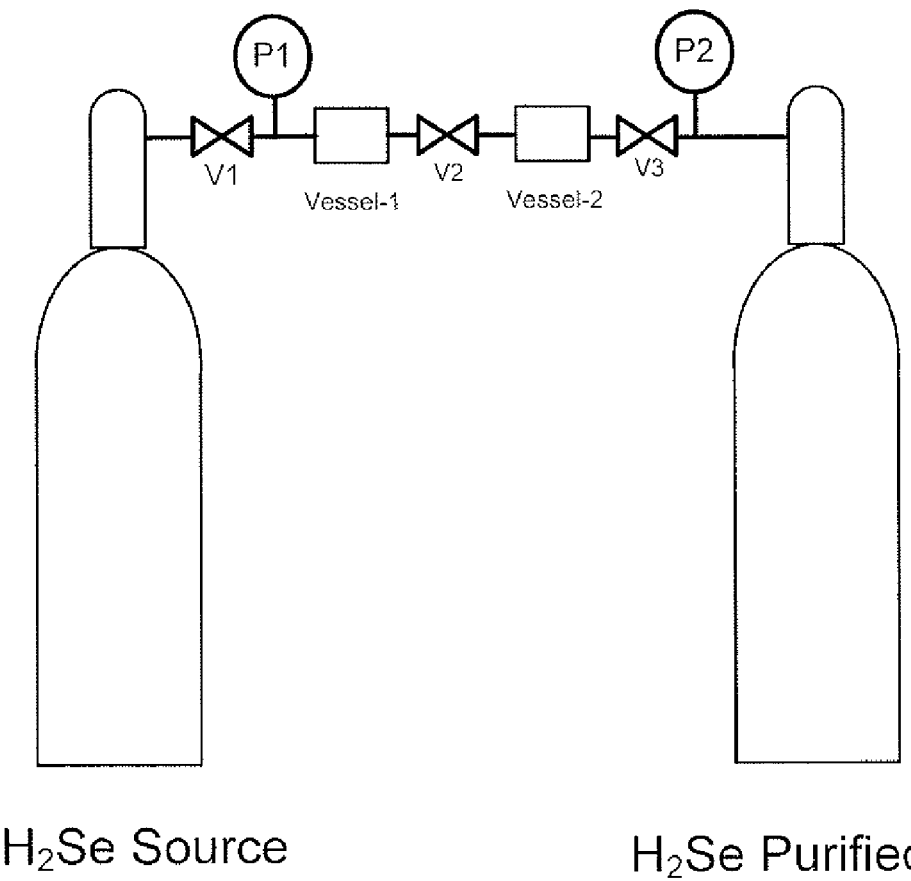
FIG. 2 is an illustration of an exemplary purification system.

One exemplary purification system is depicted in FIG. 2. The $H_2Se$-containing gas is contained in the cylinder labeled $H_2Se$ Source. The cylinder valve (not shown) and valve V1 are opened allowing the $H_2Se$-containing gas to flow into Vessel-1 containing one of the disclosed molecular sieves in order to remove either $H_2O$ or $H_2S$ from the $H_2Se$-containing gas. Pressure sensor P1 indicates the $H_2Se$ Source cylinder pressure. Pressure sensor P1 may be a pressure gauge or a pressure transducer. Valve V2 is opened to allow the $H_2Se$-containing gas to flow to Vessel-2 containing a different molecular sieve than contained in Vessel-1. For example, if Vessel-1 contains AW-500, Vessel-2 contains 4 A. Alternatively if Vessel-1 contains 4 A, Vessel-2 contains AW-500. In another alternative, both Vessel-1 and Vessel-2 may contain both AW-500 and 4 A. The purified $H_2Se$ then flows through valve V3 into the cylinder labeled $H_2Se$ Purified (when the cylinder valve, not shown, is open). Pressure sensor P2 will give an indication of any unexpected pressure drop across Vessel-1 or Vessel-2. Pressure sensor P2 also gives an indication $H_2Se$ gas is flowing to the $H_2Se$ Purified product cylinder. Pressure sensor P2 may also be a pressure gauge or pressure transducer. Valves V1 and V2 may be closed if service to Vessel-1 becomes necessary. Valves V2 and V3 may be closed if service to Vessel-2 becomes necessary.

Figure 3:
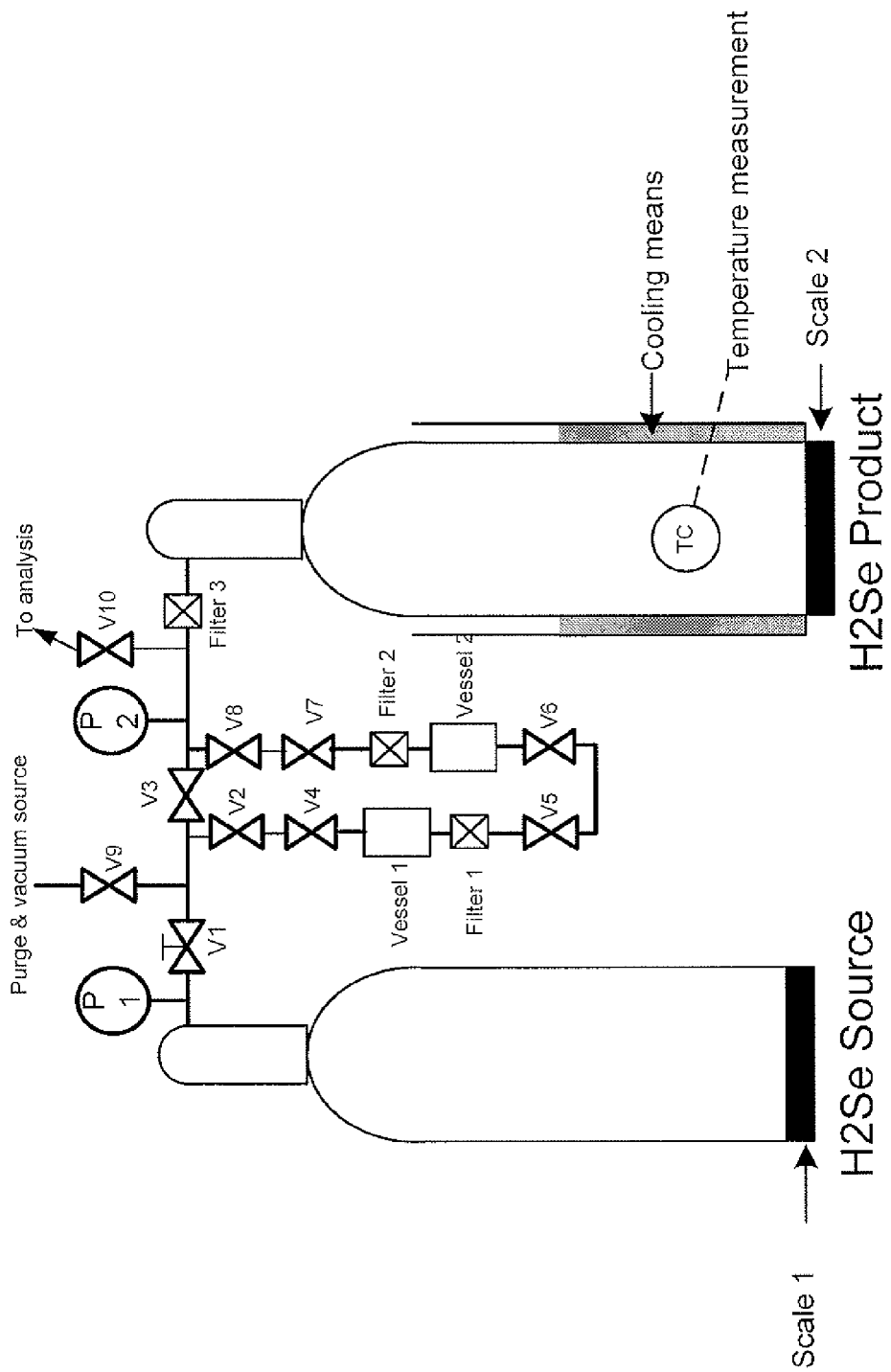
FIG. 3 is an illustration of a second purification system.

A second exemplary purification system is depicted in FIG. 3. The $H_2Se$-containing gas is contained in the cylinder labeled $H_2Se$ Source. Valve V9 is used to assure the entire system is properly purged of any contaminants by cycling between (a) pressurized purge gas (e.g., $N_2$, He, Ar, or other inert gas) and (b) pulling a vacuum on the system. Whenever the source or product cylinder is connected or disconnected from the system, the purge/vacuum cycling would be used to maintain the purity of the $H_2Se$ purification system. This procedure will also prevent any $H_2Se$ exiting the system to expose the operator and prevent the entrance of air and other impurities into the system.

Before operation of the purification system all valves would be closed. The $H_2Se$ Source cylinder valve (not shown) would be opened, followed by valves V1, V2, V4, V5, V6, V7, and V8. Vessel 1 may contain molecular sieve 4 A and Vessel 2 may contain molecular sieve AW-500. Alternatively, Vessel 1 may contain molecular sieve AW-500 and Vessel 2 may contain molecular sieve 4 A. In another alternative, both Vessel 1 and Vessel 2 may include both molecular sieve AW-500 and 4 A. Pressures sensor P1 indicates the $H_2Se$ Source cylinder pressure. Filter 1 and Filter 2 are used to prevent particulates from coming out of Vessel 1 and Vessel 2 and going into the purified $H_2Se$ Product cylinder. Pressure sensor P2 will give an indication of any unexpected pressure drop across Vessel 1, Vessel 2, Filter 1 or Filter 2. Pressure sensor P2 also gives an indication that $H_2Se$ gas is flowing to the $H_2Se$ Product cylinder.

V10 may be used to send an $H_2Se$ sample to analysis instrumentation to determine if the $H_2Se$ is the proper quality to fill in the $H_2Se$ Product cylinder. If the $H_2Se$ quality is at the required level, cooling means together with the thermocouple TC may be used on $H_2Se$ Product cylinder to reduce the pressure of the cylinder maintain a pressure differential between the source cylinder and the product cylinder. Suitable cooling means include liquid baths capable of cooling the $H_2Se$ Product cylinder to temperatures as low as −60° C., such as liquid nitrogen, dry ice, acetone, isoproponal, and other known heat transfer liquids. The cooling means and TC act as a temperature controller to cool the product cylinder. This creates a pressure difference that enables flow of $H_2Se$ from the $H_2Se$ Source to the $H_2Se$ Product. Once the $H_2Se$ Product cylinder valve (not shown) is opened, high purity $H_2Se$ will flow from the $H_2Se$ Source cylinder to the $H_2Se$ Product cylinder. Scale 1 will be able to indicate the amount of product that has left $H_2Se$ Source cylinder and scale 2 will indicate the amount of product that has been filled into the $H_2Se$ Product cylinder. Valves V4 and V5 may be closed if service to Purifier 1 and/or Filter 1 becomes necessary. Valves V6 and V7 may be closed when service to Purifier 2 and/or Filter 2 becomes necessary. Filter 3 is a final filter used to assure no particles enter the $H_2Se$ product. If purification of the $H_2Se$ source is not necessary, valves V2 and V8 may be closed and valves V1 and V3 opened.

EXAMPLES

The following non-limiting examples are provided to further illustrate embodiments of the invention. However, the examples are not intended to be all inclusive and are not intended to limit the scope of the inventions described herein.

Example 1

The following series of molecular sieves and catalysts were screened.

|   | Purifiers | $H_2O$ challenge | $H_2O$ removal | $H_2S$ challenge | $H_2S$ removal |
|---|---|---|---|---|---|
| A | AW-300 | 60 | 0% | 39.2 | 25% |
| B | AW-500 25C | — | NT | 39.2 | 85% |
| B | AW-500 3C | — | NT | 33.8 | 30% |
| B | AW500 -15C | 690 | 0% | 38.2 | 22% |
| C | 5A | 690 | 0% | 38.2 | 0% |
| D | 4A Pt—Si | — | NT | 38.2 | 13% |
| E | ZnO | 690 | 0% | 38.2 | 61% |
| F | R3-12 3 × 5 mm | 690 | 10% | 38.2 | 38% |
| G | R3-12 0.5-1.0 mm | 75 | 30% | 45 | 47% |
| H | BASF COS | 75 | 0% | 45 | 28% |
| J | 4A | 75 | 95% | 45 | 36% |

NT—Not Tested

The $H_2O$ and $H_2S$ challenge levels in the table represent the amounts of $H_2O$ and $H_2S$ in ppmv that were in the $H_2Se$ source. The $H_2O$ and $H_2S$ removal columns provide the % v/v of each that were removed from $H_2Se$.

The $H_2O$ challenge and $H_2O$ removal analysis was performed by a Meeco Aquavolt+ with a $P_2O_5$ electrolyte $H_2O$ analyzer. However, Se deposited on the $P_2O_5$ electrolyte. Additionally, the response time was very slow. As a result, $H_2O$ analysis was not performed in all of the tests in the table above. Additional $H_2O$ analysis was performed with a HALO $H_2O$ analyzer.

The $H_2S$ challenge and the $H_2S$ removal analysis was performed by GC HP 5890/PDHID. A Restek GC column capable of detecting $N_2$, $O_2$, $CO_2$, $CH_4$, and $H_2S$ in the $H_2Se$-containing gas was utilized. The GC was calibrated using a gas standard containing 30 and 100 ppm of each of these impurities. The detection limits were ~0.1 ppm (3×S/N).

In addition to measuring the removal of the $H_2S$ and $H_2O$ impurities, the generation of other impurities due to contact with $H_2Se$ was analyzed.

While ZnO successfully removed $H_2S$, it seemed to produce another impurity that has not yet been identified.

Molecular sieve 5 A did not remove $H_2O$ or $H_2S$. This may be the result of $H_2Se$ adsorption in the 5 angstrom pores.

AW-500 removed $H_2S$ while releasing some $CO_2$. Surprisingly, AW-500 removed $H_2S$ from $H_2Se$, even though AW-500 has the same 5 angstrom pore size as molecular sieve 5A. Capacity of the AW-500 molecular sieve for $H_2S$ in $H_2Se$ was found to be >1% g $H_2S$/g AW-500.

The capacity of the 4 A molecular sieve for $H_2O$ in $H_2Se$ was found to be 2.4% g $H_2O$/g 4 A.

Example 2

One vessel containing 4 A molecular sieve was used specifically to remove $H_2O$ from $H_2Se$ at ~110 psig @ 72° F. The second vessel containing AW-500 molecular sieve, and in series with the first vessel, was used to remove $H_2S$ from $H_2Se$ at ~110 psig @ 72° F. Analytical equipment capable of measuring both $H_2S$ and $H_2O$ concentrations in $H_2Se$ was located downstream of the vessels. Measurement of the level of $H_2O$ in $H_2Se$ was below 1 ppm, and $H_2S$ in $H_2Se$ was below 5 ppm. At these levels the chance for reaction with $H_2O$ or $H_2S$ in the process is quite low.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

The invention claimed is:

1. A method of purifying a $H_2Se$-containing gas, the method comprising reducing an amount of $H_2S$ in the $H_2Se$-containing gas below 10 ppmv by passing the $H_2Se$-containing gas through an AW-500 molecular sieve.

2. The method of claim 1, wherein the purified $H_2Se$-containing gas contains less than 5 ppmv $H_2S$.

3. The method of claim 1, further comprising reducing an amount of $H_2O$ in the $H_2Se$-containing gas below 20 ppmv by passing the $H_2Se$-containing gas through a 4 A molecular sieve.

4. The method of claim 3, wherein the purified $H_2Se$-containing gas contains less than 1 ppm $H_2O$.

5. The method of claim 3, wherein the $H_2Se$-containing gas is passed through the 4 A molecular sieve prior to being passed through the AW-500 molecular sieve.

6. The method of claim 3, further comprising receiving the purified $H_2Se$-containing gas in a cylinder cooled to a temperature ranging from approximately −20° C. to approximately −60° C.

7. The method of claim 1, further comprising receiving the purified $H_2Se$-containing gas in a cylinder cooled to a temperature ranging from approximately −20° C. to approximately −60° C.

8. A purification method for $H_2Se$, the method comprising:
 passing $H_2Se$ through a 4 A molecular sieve; and
 subsequently passing $H_2Se$ through an AW-500 molecular sieve.

9. The method of claim 8, wherein the purified $H_2Se$ contains less than 10 ppmv $H_2S$.

10. The method of claim 9, wherein the purified $H_2Se$ contains less than 5 ppmv $H_2S$.

11. The method of claim 8, wherein the purified $H_2Se$ contains less than 20 ppmv $H_2O$.

12. The method of claim 11, wherein the purified $H_2Se$ contains less than 1 ppm $H_2O$.

13. The method of claim 8, further comprising receiving the purified $H_2Se$ in a cylinder cooled to a temperature ranging from approximately −20° C. to approximately −60° C.

* * * * *